Aug. 17, 1965 R. J. HAMMOND 3,201,132

DRIVE YOKE FOR PHONOGRAPH PICKUPS

Filed Aug. 27, 1962

INVENTOR.

Robert J. Hammond

BY

Brown, Jackson, Boettcher & Dienner

Attys

United States Patent Office 3,201,132
Patented Aug. 17, 1965

3,201,132

DRIVE YOKE FOR PHONOGRAPH PICKUPS

Robert J. Hammond, Stevensville, Mich., assignor to V-M Corporation, Benton Harbor, Mich., a corporation of Michigan Filed Aug. 27, 1962, Ser. No. 219,574
3 Claims. (Cl. 274—37)

The present invention relates to a cartridge or pickup for phonographs which is adapted to substantially reduce the effects of lateral shock and provide improved tracking of a stylus in the groove of a record, whereby the stylus will remain in the record groove even when an associated tone arm or phonograph record changer is subjected to relatively severe lateral shock.

More specifically, the invention relates to a novel form of drive yoke for phonograph pickups which drive yoke is adapted to permit relative lateral movement of a stylus seated therein when an associated tone arm or a record being reproduced is subjected to appreciable lateral shock, thereby permitting the stylus to remain in the proper groove of the record.

The sensitivity of substantially all types of phonographs currently in use to shock or vibration is well known and is one of the principal disadvantages of such devices. The present tendency is to employ reduced needle pressure, that is, to reduce the pressure exerted by a needle or stylus on a record being reproduced, and when this is done the undesirable effects of shock or vibration are often substantially increased.

In a conventional cartridge, a stylus is mounted so as to cooperate with a drive yoke or coupling member whereby movements of the stylus as it tracks in the groove of a record are transmitted to the drive yoke, which in turn transmits such motions to transducing elements within the cartridge. Cartridges designed for the reproduction of monaural recordings are constructed so that lateral motions of the stylus are transmitted through the drive yoke to the transducing elements. On the other hand, cartridges designed for stereophonic reproduction are constructed so that lateral motion as well as any other motion in a direction perpendicular to a stylus-carrying arm will be transmitted through the yoke to the transducing elements of the cartridge. The present invention is concerned with lateral movement of a stylus relative to a drive yoke when subjected to the influence of shock or vibration, and is applicable both to monaural and stereophonic cartridges.

The lower end of a cartridge drive yoke which cooperates with a stylus arm to transmit motions of the stylus to cartridge transducing elements commonly comprises an inverted generally V-shaped member having a pair of ears or the like between which the stylus arm is seated. When the stylus is engaged in the groove of a record for reproduction thereof, the stylus arm is urged upwardly between the ears of the yoke so as to be seated in the bight portion of the yoke at the junction of the yoke ears. In this manner, motions of the stylus are transmitted to the drive yoke.

In cartridges of the type heretofore known, the inverted generally V-shaped yoke comprises a pair of ears or the like which fit rather closely about the stylus arm so as to assure that a proper drive connection is provided therebetween. In one known form of drive yoke, a substantially semi-circular recess is formed in the bight portion of the yoke at the junction of the ears so as to provide a relatively snug seat for the stylus carrying arm. In the foregoing as well as in other known forms of drive yokes, the angle between the downwardly projecting yoke ears is made relatively small for the purpose of assuring that when the stylus is operatively engaged in the groove of a record the stylus arm will be firmly held in the yoke. In conventional drive yokes the included angle between the yoke ears is generally less than 90 degrees, and frequently is substantially less than that amount.

Drive yokes of the type heretofore known, as described above, while adapted to transmit motions of the stylus to the transducer elements in a cartridge, are not well suited to alleviating the effects of lateral shock applied either to an associated tone arm or to a record being reproduced. This is due to the fact that the stylus will normally move laterally relative to a record groove in which it is engaged more readily than the stylus arm will move laterally with respect to the drive yoke in which it is seated. Consequently, when an associated tone arm or a record being reproduced is subjected to lateral shock, the cartridge drive yoke will be moved laterally relative to the record, and the stylus arm will follow the drive yoke causing the stylus to skip to the next groove in the record.

In explanation of the foregoing, it is important to note that the groove angle of a standard phonograph record varies between 80 degrees and 100 degrees, and is usually approximately 90 degrees. That is, the sides of a record groove intersect to form an angle of 90 degrees, which angle is as large and in most instances substantially larger than the angle defined by the ears of a conventional cartridge drive yoke. Consequently, the lateral force required to cause a stylus to skip from one record groove to another is smaller than the lateral force required to cause a stylus arm to move laterally a similar distance relative to the drive yoke in which it is seated. It is for this reason that lateral shock will cause a stylus to follow the drive yoke and move laterally with respect to a record being reproduced rather than permit the stylus to remain in its record groove and move laterally relative to the drive yoke.

It is a general object of the present invention to provide a novel drive yoke construction for phonograph pickups which is adapted to reduce the effects of lateral shock applied either to a tone arm or to a record being reproduced.

A more specific object of my invention is to provide a cartridge drive yoke which will permit a stylus arm seated between the yoke ears to move laterally with respect thereto upon application of appreciable lateral shock to an associated tone arm or a record being reproduced, whereby the yoke may be moved laterally relative to the record without causing the stylus to be moved out of the record groove in which it is engaged.

These and other objects and advantages of my invention will be apparent from the following description thereof, taken in conjunction with the accompanying drawings in which.

Figures 1, 2, 3:
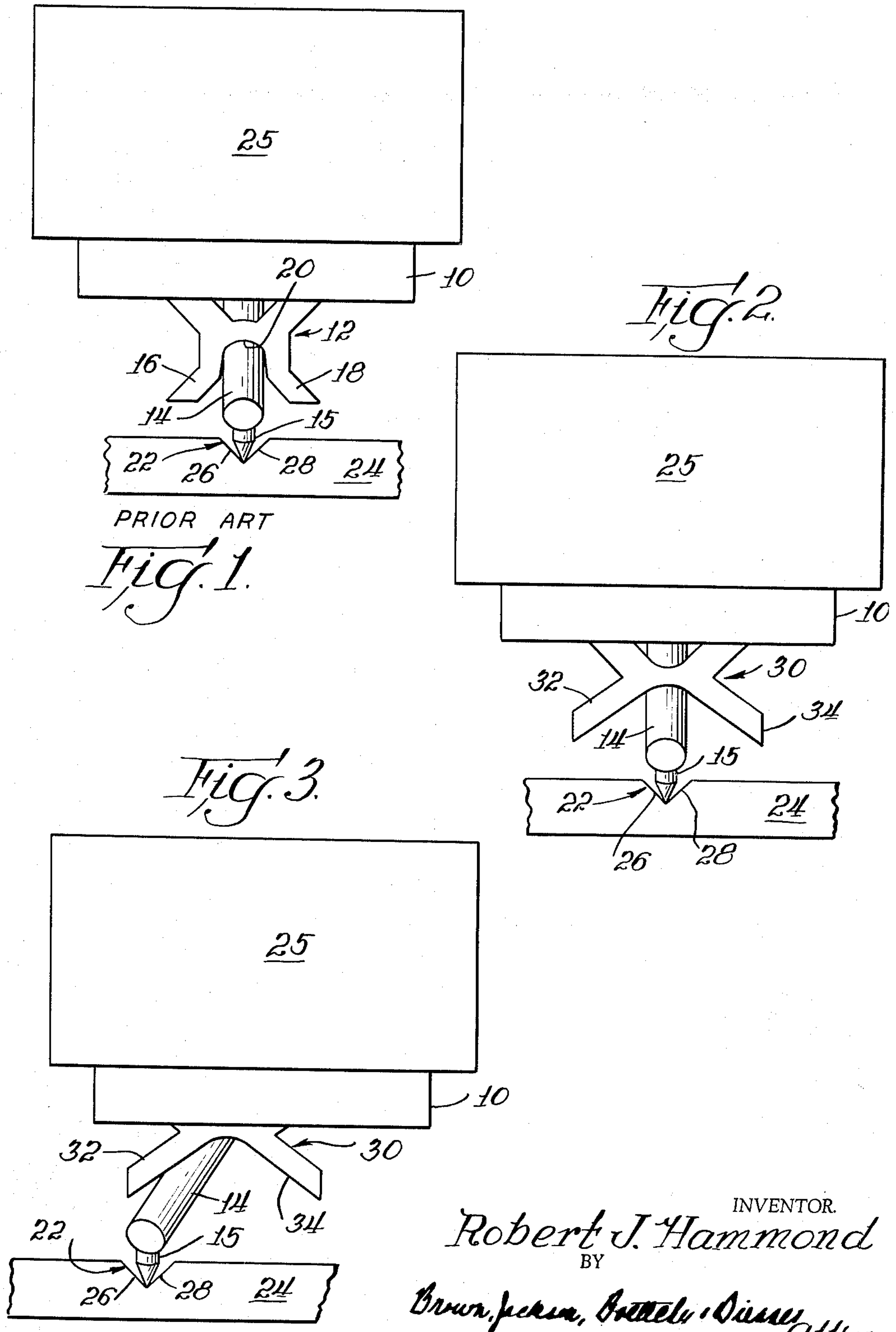
PRIOR ART FIG. 1, FIG. 2, FIG. 3
FIGURE 1 is a partly schematic front elevational view showing a conventional cartrige and drive yoke assembly mounted in the head of a tone arm and disposed in playing position with a stylus arm seated in the yoke and a stylus engaged in the groove of a record, the record groove being magnified relative to the other elements for purposes of clarity.
FIGURE 2 is a view similar to FIGURE 1 showing a drive yoke constructed in accordance with the present invention.
FIGURE 3 is a view showing the relative position of the components of FIGURE 2 when either the tone arm or the record being reproduced is subjected to lateral shock.

In order to better understand the improvements effected by the present invention, reference is first made to FIGURE 1 which shows a conventional cartridge and drive yoke assembly. There is shown a cartridge 10 which has associated therewith a drive yoke 12 and a stylus assembly comprising a stylus arm 14 and a stylus 15. The stylus 15 is carried on the forward end of the stylue arm 14, and the other end of the stylus arm is supported from the cartridge 10 in cantilever fashion in a manner which is well understood in the art and thus not described in detail herein.

The lower end of the drive yoke 12 comprises a generally inverted V-shaped member having a pair of yoke ears 16 and 18 which define an angle therebetween of not more than 90 degrees. A generally semi-circular recess 20 is formed in the bight portion of the drive yoke 12 at the junction of the ears 16 and 18, and the stylue arm 14 is seated in the recess 20 with the stylus 15 engaged in a groove 22 of a phonograph record 24. The cartridge assembly is mounted in the head of a phonograph tone arm 25 in the usual manner for reproduction of the record 24 as the tone arm traverses the record.

The record groove 22 is formed by sides 26 and 28 which define an angle of approximately 90 degrees, as is typical with phonograph records of the type presently in use. Accordingly, if a lateral shock is applied to the tone arm 25 of FIGURE 1 or to the record being reproduced, the yoke 12 will be moved laterally relative to the record, and the stylus arm 14 will follow the yoke thus causing the stylus 15 to be moved out of the groove 22. This is due to the fact that the force required to move the stylus 15 relative to the record is less than the force which would be required to effect relative lateral movement between the stylus arm 14 and the relatively close fitting yoke 12.

Reference is now made to FIGURE 2 wherein the tone arm, cartridge, and stylus assembly are the same as in FIGURE 1 and are thus identified by corresponding reference numerals, but where the cartridge is associated with a novel drive yoke 30 which is constructed in accordance with the present invention. The drive yoke 30 is of an inverted V-shaped configuration and comprises a pair of yoke ears 32 and 34 which define an angle therebetween of approximately 110 degrees, the included angle thus being substantially greater than in conventional drive yokes.

By sloping the yoke ears 32 and 34 more toward the horizontal as shown in FIGURE 2, the stylus arm 14 is permitted to move laterally relative to the yoke when either the tone arm 25 or the record 24 is subjected to appreciable lateral shock, and the stylus 15 will thus tend to remain in the record groove 22. In other words, since the stylus arm 14 is seated between the yoke ears 32 and 34 which define an angle of 110 degrees, while the stylus 15 is seated in the record groove 22 which defines an angle of approximately 90 degrees, lateral shock will cause the stylus assembly to move relative to the yoke rather than with respect to the record.

I have found that when a phonograph tone arm is equipped with a cartridge having a drive yoke constructed in accordance with the present invention, the tone arm can be moved laterally at least approximately 0.125 inch relative to the record without causing the stylus to be removed from a record groove in which it is operatively engaged. FIGURE 3 illustrates the manner in which the stylus arm 14 will be moved relative to the yoke 30 in such instances, thus permitting the stylus 15 to remain in the record groove 22.

As stated above, the optimum included angle between the yoke ears 32 and 34 is approximately 110 degrees. I have found that a range of angles between 105 degrees and 120 degrees will produce highly satisfactory results. If the angle between the yoke ears is appreciably less than 105 degrees, it too closely apporaches the 90 degree record groove angle to produce the desired results, and while angles in excess of 120 degrees may be used, such wide angles are not necessary to satisfactorily reduce the effects of lateral shock.

It is, of course, a fundamental requirement that the drive yoke be adapted to accurately transmit lateral motions of the stylus arm 14 as well as other motions perpendicular to the arm where stereophonic equipment is used. However, the widening of the included angle between the ears of the drive yoke in accordance with the present inventive teaching will not diminish in any way the capacity of the yoke to accomplish such purpose. The needle pressure, that is, the vertical force between the stylus and the record produced by the weight of the tone arm, will under normal playing conditions cause the stylus arm 14 to be seated in the yoke at the junction of the ears 32 and 34, and the yoke will thus accurately transmit lateral motions of the stylus arm, even when the included angle between the yoke ears is 120 degrees or more.

The invention described herein has been found to be extremely effective in enabling a stylus to remain in a record groove in which it is tracking even when subjected to relatively severe lateral shock, and it will thus alleviate one of the most significant disadvantages of present day record changers. The present invention is well suited for use in combination with structure adapted to reduce the effects of vertical shock, as described in my copending application Serial No. 203,881, filed June 20, 1962, now abandoned, and assigned to the assignee of the present invention.

While I have illustrated my invention in certain preferred forms, I do not intend to be limited to such forms, except insofar as the appended claims are so limited, since modifications coming within the scope of my invention will be readily suggested to others with my disclosure before them.

I claim:

1. For use in a phonograph pickup, a drive yoke for transmitting motions from a stylus arm to transducing elements in the pickup, said yoke being generally of inverted V-shaped configuration and comprising a pair of downwardly projecting yoke ears which define therebetween an angle between the range of 105 degrees and 120 degrees, whereby a stylus arm seated between said yoke ears will move laterally relative thereto more readily than a corresponding stylus carried by said stylus arm will move laterally out of a record groove in which it is operatively engaged.

2. The invention claim 1 wherein the included angle between said yoke ears is approximately 110 degrees.

3. For use in a phonograph pickup, a drive yoke for transmitting motions from a stylus arm to transducing elements in the pickup, said yoke comprising a stylus-holding seat having converging side portions which define an included angle between the range of 105 degrees and 120 degrees, whereby a stylus arm seated in said stylus-holding seat will move laterally relative thereto more readily than a corresponding stylus carried by said stylus arm will move laterally out of a record groove in which it is operatively engaged.

References Cited by the Examiner

UNITED STATES PATENTS

| | | | |
|---|---|---|---|
| 2,934,610 | 4/60 | Dieter | 274—37 X |
| 2,939,716 | 6/60 | Bauer et al. | 274—37 |
| 2,962,290 | 11/60 | Gunter et al. | 274—37 |
| 3,102,171 | 8/63 | Laux | 179—100.4 |

OTHER REFERENCES 1,119,533 12/61, German application.

EVON C. BLUNK, *Primary Examiner*.

NORTON ANSHER, *Examiner*.